(12) United States Patent
Williams

(10) Patent No.: US 11,857,136 B2
(45) Date of Patent: Jan. 2, 2024

(54) FLOOR MAT AND METHOD OF USE

(71) Applicant: Chris Williams, Arlington, TX (US)

(72) Inventor: Chris Williams, Arlington, TX (US)

( * ) Notice: Subject to any disclaimer, the term of this patent is extended or adjusted under 35 U.S.C. 154(b) by 0 days.

(21) Appl. No.: 16/258,383

(22) Filed: Jan. 25, 2019

(65) Prior Publication Data

US 2019/0223687 A1    Jul. 25, 2019

Related U.S. Application Data

(60) Provisional application No. 62/621,656, filed on Jan. 25, 2018.

(51) Int. Cl.
*A47L 23/26* (2006.01)
*B32B 25/20* (2006.01)
*B32B 7/12* (2006.01)

(52) U.S. Cl.
CPC .............. *A47L 23/266* (2013.01); *B32B 7/12* (2013.01); *B32B 25/20* (2013.01); *B32B 2250/02* (2013.01); *B32B 2307/7145* (2013.01); *B32B 2307/7265* (2013.01); *B32B 2307/744* (2013.01); *B32B 2471/04* (2013.01)

(58) Field of Classification Search
CPC ........ A47L 23/22; A47L 23/26; A47L 23/266; A47G 37/00; A47G 37/02; A47G 37/0206; A47G 37/0212; A47G 37/0225; A61L 2/00; A61L 2/02; A61L 2/16; A61L 2/18; B32B 7/12; B32B 25/20; B32B 2250/02; B32B 2307/7145; B32B 2307/7265; B32B 2307/744; B32B 2471/04

USPC .............................. 15/215–217; D6/592, 583
See application file for complete search history.

(56) References Cited

U.S. PATENT DOCUMENTS

| | | | | |
|---|---|---|---|---|
| 2,282,672 | A * | 5/1942 | Nelson .................. | A47L 23/266 15/104.92 |
| 3,696,459 | A * | 10/1972 | Kucera ................. | A47L 23/266 15/104.92 |
| 5,792,712 | A * | 8/1998 | Hori ....................... | A01N 25/34 15/104.93 |
| 6,146,588 | A * | 11/2000 | Deighton ............... | A01N 25/00 15/104.92 |
| D666,447 | S * | 9/2012 | Zemel ........................... | D6/592 |
| 9,451,871 | B1* | 9/2016 | Seaberg ................. | A47L 23/266 |
| 2004/0171511 | A1* | 9/2004 | Nagai ....................... | A61L 2/18 510/415 |
| 2007/0092547 | A1* | 4/2007 | Birnbaum .............. | A01N 25/34 424/769 |
| 2010/0296970 | A1* | 11/2010 | Trimarco ................ | A47K 3/022 422/37 |
| 2010/0316528 | A1* | 12/2010 | Jordan .................... | A01N 25/34 424/411 |

(Continued)

FOREIGN PATENT DOCUMENTS

| | | | |
|---|---|---|---|
| WO | 98/22280 | * | 5/1998 |
| WO | 98/37981 | * | 9/1998 |
| WO | WO 2009/108158 A1 | * 3/2009 | ............. A01N 59/16 |

*Primary Examiner* — Laura C Guidotti
(74) *Attorney, Agent, or Firm* — Richard Eldredge; Leavitt & Eldredge Law Firm

(57) ABSTRACT

A floor mat includes a bottom layer and a top layer; the bottom layer being composed of a water tight material; and the top layer being composed of an absorbent, antibacterial material; the top layer is removably secured to the bottom layer and is disposable.

7 Claims, 2 Drawing Sheets

(56) References Cited

U.S. PATENT DOCUMENTS

2014/0223684 A1* 8/2014 Hawkins ............... A47L 23/266
  15/216
2016/0015844 A1* 1/2016 Collins .................... A61L 2/18
  424/411

* cited by examiner

FLOOR MAT AND METHOD OF USE

BACKGROUND

1. Field of the Invention

The present invention relates generally to the field of floor mats and more specifically relates to a unique, disposable doormat structured and arranged to clean one's shoe soles at the door while disinfecting them as well thereby keeping interior floors and carpets clean and hygienic.

2. Description of Related Art

Consider, for example, that almost everyone has a doormat at each entrance to their home. And while these mats do a good job of cleaning the dirt, mud, or other detritus of the day from the soles of our shoes, they do nothing to prevent our tracking other unwanted things—germs, viruses, bacteria—into homes and other facilities, contaminating floors, rugs, and carpets, and potentially leading to sickness. Therefore, a need exists for a floor mat that would offer consumers as well as commercial and institutional establishments a unique improvement of the doormat that would do far more than a conventional mat, and thus keep our interiors not just free of dirt, but free of shoe-borne contamination as well.

Thus, a need exists for a reliable floormat, a unique, disposable doormat structured and arranged to clean one's shoe soles at the door while disinfecting them as well thereby keeping interior floors and carpets clean and hygienic and to avoid the above-mentioned problems.

BRIEF SUMMARY OF THE INVENTION

In view of the foregoing disadvantages inherent in the known floor mat art, the present invention provides a novel floormat. The general purpose of the present invention, which will be described subsequently in greater detail, is to provide a unique, disposable doormat structured and arranged to clean one's shoe soles at the door while disinfecting them as well thereby keeping interior floors and carpets clean and hygienic. the floormat would kill bacteria, viruses, and other microbes at the door, and prevent their being tracked, as well as dirt and debris, into the interior of home, office, store, school, or health-care facility, thereby maintaining a healthier interior environment. The features of the invention which are believed to be novel are particularly pointed out and distinctly claimed in the concluding portion of the specification. These and other features, aspects, and advantages of the present invention will become better understood with reference to the following drawings and detailed description.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
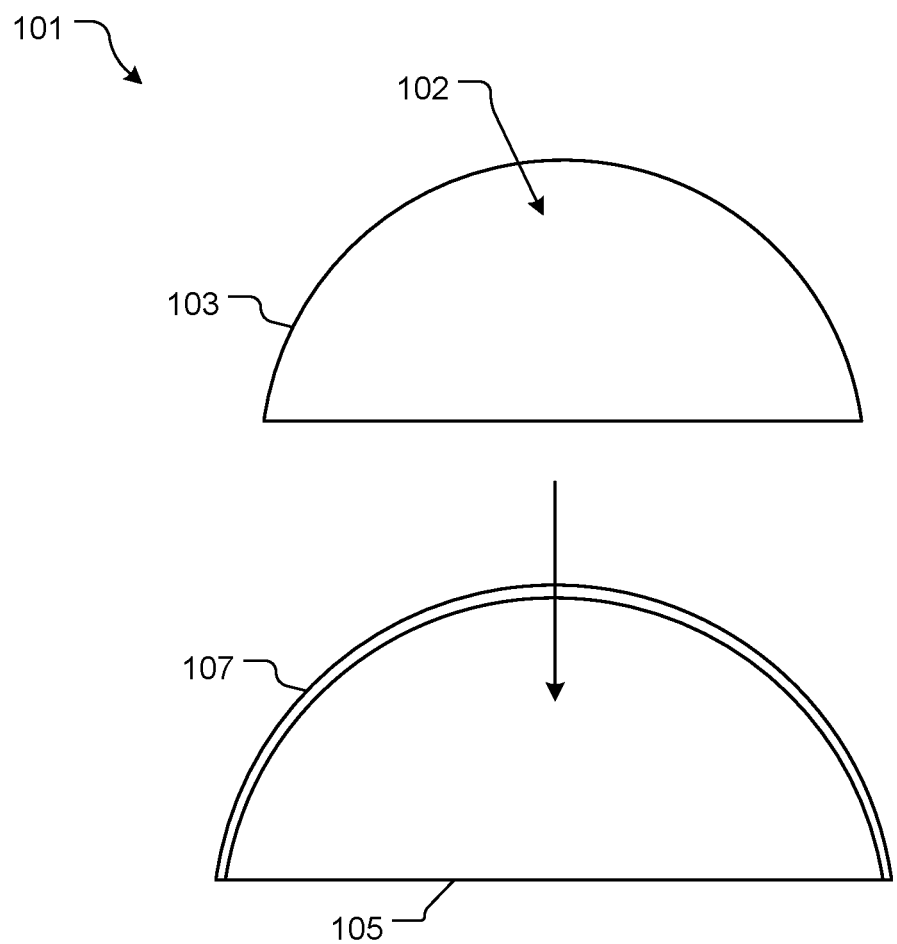
FIG. 1 is a top view of a floormat system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

As discussed above, embodiments of the present invention relate to a floor mat having a unique, disposable doormat structured and arranged to clean one's shoe soles at the door while disinfecting them as well thereby keeping interior floors and carpets clean and hygienic. The floormat of the present invention would kill bacteria, viruses, and other microbes at the door, and prevent their being tracked, as well as dirt and debris, into the interior of home, office, store, school, or health-care facility, thereby maintaining a healthier interior environment.

Referring now to the drawings FIG. 1, the floormat system 101 includes a top layer 103 with a top surface 102, the top layer to removably secures to a bottom layer 105, the bottom layer optionally having a raised edge 107 configured to support the top layer 103 as the top layer 103 is placed on the bottom layer. The raised edge 107 is secured to the bottom layer 105, the bottom layer forming a curved perimeter section and a straight perimeter section as shown in FIG.

Figure 2:
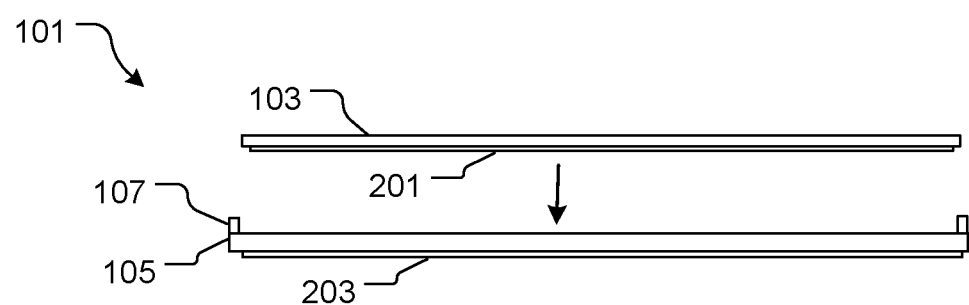
FIG. 2 is an end view of the system of FIG. 1.

1. Also, FIG. 1 shows that the raised edge 107 extends solely around the curved perimeter section. As shown in FIG. 2, the top layer 103 can include an adhesive 201 and the bottom layer 105 can include a non-skid surface 203. In one embodiment, the bottom layer is injection molded.

Figure 3:
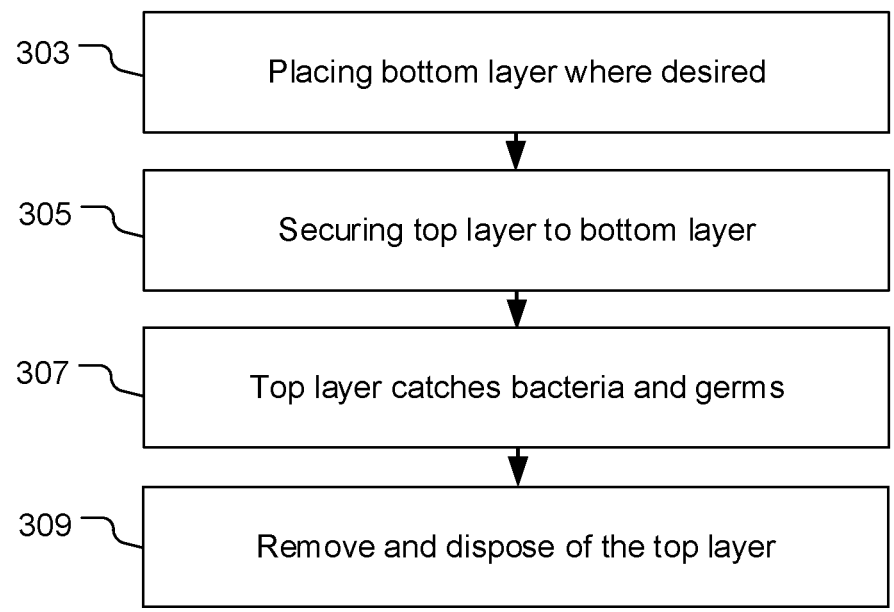
FIG. 3 is a flowchart of the method of use of the system of FIG. 1.

In FIG. 3, a flowchart 301 depicts the method of use of system 101. During use, the user places the bottom layer in a desired location and changes the top layer as needed for keeping their home clean, as shown with boxes 303, 305, 307, 309.

The floormat comprising a novel product offering consumers a practical solution to the aforementioned challenges. The floormat comprises a specially designed rubber, non-slip bottom, and a synthetic-fiber upper surface that is antibacterial/antimicrobial and absorbent. Further, it should be appreciated that the materials that make up the top layer are non-toxic for humans and animals. The floormat would be offered in a variety of sizes for residential, commercial, and institutional users. The mat would feature a green, oval border to signify its disinfecting character, and the synthetic fibers of the wiping surface tough, durable bristles—would be impregnated with a long-lasting disinfectant solution.

Once stepping onto the mat, the solution contained in the mat will resist and kill germs, bacteria, and other microbes. The top layer when due is simply disposed of, and replaced with a fresh one.

The floormat system would be fully self-contained, and require no maintenance beyond its replacement when due. No moving parts, nothing to fill or refill: Simply place the floormat outside the door and it will do its work. Like any high-quality doormat, the floormat would effectively remove dirt, mud, and other matter from the soles of one's shoes; but unlike any other doormat, the top layer would also kill and eliminate from one's shoe soles—viruses, bacteria, and other potentially harmful microbes that would otherwise (with other mats) be tracked into the house and across floors, carpets, and rugs.

Clever in conception, thoughtful in design, the top layer disinfecting doormat should clearly find a wide and enthusiastic market among America's consumer households, as well as among commercial establishments such as hotels and restaurants, a multitude of business establishments, and among institutional establishments such as health-care facilities and schools. The floormat is cost-effective to produce in the embodiments, as shown in FIG. 1.

Some contemplated materials for use in the top layer include: an antigerm silicone rubber; contains a silicon resin material; *salmonella, E. coli* bacteria, virus and germ resistant silicone material; a methicillin resistant and *staphylococcus aurera* resistant silicone material; material with antimicrobial tea tree oil.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A floor mat comprising:
    a bottom layer and a top layer, the top layer having a lower surface, the bottom layer forming a curved perimeter section and a straight perimeter section, the bottom layer includes a non-skid surface;
    an adhesive secured to the lower surface, the adhesive is configured to removable secure the bottom layer to the top layer;
    the bottom layer is composed of a water tight material;
    a raised edge secured to the bottom layer, the raised edge extends solely around the curved perimeter section; and
    the top layer is composed of a synthetic-fiber material and an absorbent, antibacterial material and contains an antibacterial colloidal silver mixture with a methicillin resistant and *staphylococcus* aurera resistant silicone material;
    wherein the top layer is removably secured to the bottom layer and is disposable.

2. The floor mat according to claim 1, wherein the top layer is non toxic to humans and animals.

3. The floor mat according to claim 1, wherein the top layer contains an antigerm silicone rubber.

4. The floor mat according to claim 1, wherein the top layer contains a silicon resin material.

5. The floor mat according to claim 1, wherein the top layer contains *salmonella, E. coli* bacteria, virus and germ resistant silicone material.

6. The floor mat according to claim 1, wherein the bottom layer is injection molded.

7. The floor mat according to claim 1, wherein the top layer contains antimicrobial tea tree oil.

\* \* \* \* \*